July 26, 1955
W. C. BALLARD, JR
2,714,189
ELECTROLYTIC METHOD AND CELL
Filed July 17, 1951
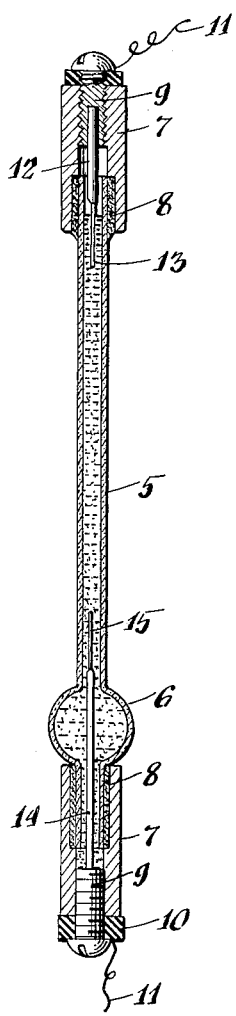
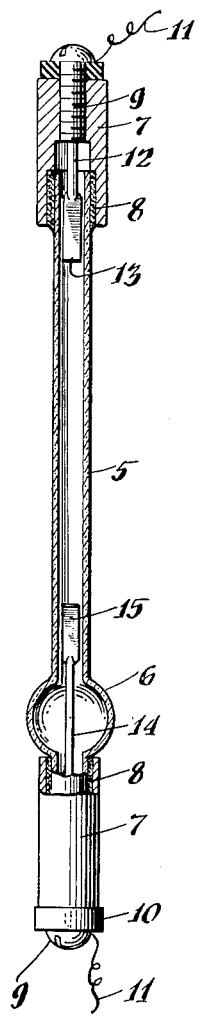
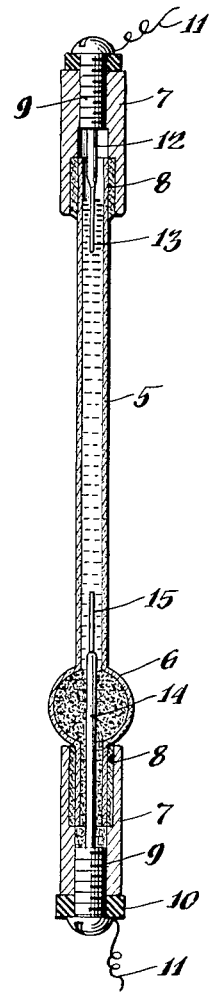
INVENTOR.
*William C. Ballard, Jr.*
BY *Duell and Kane*
ATTORNEYS

United States Patent Office 2,714,189
Patented July 26, 1955

2,714,189
ELECTROLYTIC METHOD AND CELL

William C. Ballard, Jr., Ithaca, N. Y.; Robert O. Klausmeyer, executor of said William C. Ballard, Jr., deceased, assignor to Ruth B. Klausmeyer Application July 17, 1951, Serial No. 237,255

2 Claims. (Cl. 324—30)

This invention relates to a method of determining the constituents of a liquid and also aims to provide a cell of novel and improved construction to be used in connection with the practice of that method.

While the present invention is capable of diverse application, it is primarily intended for employment in connection with a red cell blood count. As such, it will enable a skilled technician to readily determine the cell count existing in a given blood sample. Also, where used aside from the determination of such a count the constituents providing the solution being tested may in many instances be accurately and quickly determined.

It is a further object to furnish an electrolytic cell of improved construction the parts of which may be readily manufactured and assembled to furnish a unit capable of being readily cleaned and operated over long periods of time with freedom from all difficulties.

With these and other objects in mind reference is had to the attached sheet of drawings illustrating one practical embodiment of the invention and in which:

Fig. 1 is a sectional side view of a cell and showing the same in filled condition;

Fig. 2 is a sectional face view thereof with no liquid solution in place; and

Fig. 3 is a view similar to Fig. 1 but showing the cell after centrifugation.

In these views numeral 5 indicates a tube preferably formed of glass and provided adjacent its lower end with an enlarged chamber 6. Metallic caps 7 are affixed to the ends of the tube preferably by means of layers of cement 8. These caps are tapped and threaded adjacent their outer ends to receive threaded terminals 9. Conveniently, a washer 10 is interposed between at least the head of the lower terminal and the adjacent cap. Leads 11 may be detachably secured in any desired manner to the terminals 9.

Affixed to the upper terminal member is an electrode 12. Conveniently, the end portion of the layer is flattened as at 13 and may be formed of a short length of platinum. This provides the effective conducting area of that electrode. The lower terminal 9 mounts an electrode 14 which, as shown, preferably extends through the chamber or enlargement 6 and into the restricted bore portion of the tube above that chamber. Again, the end portion 15 of the lower electrode is conveniently formed of platinum stock.

Now assuming that a red cell count of blood is to be taken. It will primarily be assumed that the interior of the tube and the parts associated thereof are in properly cleaned condition. The upper terminal 9 is removed together with the electrode 12—13. The interior of the tube is then filled with a blood sample. Thereafter, the upper terminal is mounted upon its cap with a washer conveniently in position to prevent any leakage of the parts. A current is now passed between the electrodes 13 and 15 and the resistance to the passage of this current is measured in any desired manner as, for example, by the use of an A. C. bridge.

It is preferred to detach the current conducting leads 11 thereafter. In any event, the filled tube is now disposed upon or connected to a centrifuge and the latter is set in operation to develop a predetermined centrifugal force. Blood may be regarded as an electrolyte (plasma) within which non-conducting particles (red corpuscles) are disposed. With centrifugation the red corpuscles will be displaced in the direction of the enlargement or chamber 6 as indicated in Fig. 3. Substantially all of them will thus be shifted towards one end of the tube and beyond the adjacent electrode portion 15 when the tube has been subjected to a centrifugal force of sufficient value. If now current is again passed between terminal members 9 the value of the resistance path may once more be determined. By comparison with the earlier reading the resistance value may be translated into a red corpuscle count.

It is apparent that the present method and cell may also be employed in connection with liquids other than blood. Of course, in each instance it will be assumed that these liquids present a solution involving, for example, conducting or non-conducting particles and a non-conducting or conducting liquid as the case may be. In any event with resistance measurements resorted to both before and after centrifugation it is apparent that determinations of the constituents of a solution may readily be made.

Thus, among others, the several objects of the invention as specifically aforenoted are achieved. It is obvious that the steps and the method may be varied and that the structure of the cell may likewise be varied without departing from the spirit of the invention as defined by the claims.

I claim:

1. A method of determining the red cell count of blood which includes subjecting a sample of blood to the passage of an electric current and measuring the resistance offered to such current flow, thereafter subjecting said sample to the action of centrifugal force to cause the red cells to be displaced towards one end of the body of fluid plasma within which they are associated, then passing an electric current through a predetermined area of the sample which has been subject to centrifugation and in measuring the resistance to the passage of the latter current flow.

2. A method of determining the presence of elements in a fluid solution which includes subjecting a sample of that solution to the passage of an electric current and measuring the resistance offered to such current flow, thereafter subjecting said sample to the action of centrifugal force to cause the elements to be displaced towards one end of the body of fluid forming a part of the solution including those elements, then passing an electric current through a predetermined area of the sample which has been subjected to centrifugation and in measuring the resistance to the passage of the latter current flow.

References Cited in the file of this patent

UNITED STATES PATENTS

| Number | Name | Date |
|---|---|---|
| 961,125 | Hatfield | June 14, 1910 |
| 1,479,087 | Rice | June 1, 1924 |
| 1,773,665 | Edelman | Aug. 19, 1930 |
| 1,860,397 | Slawinski | May 31, 1932 |
| 2,177,018 | Claassen | Oct. 24, 1939 |
| 2,358,163 | Heym | Sept. 12, 1944 |
| 2,367,592 | McDermott | Jan. 16, 1945 |
| 2,390,074 | Cohn | Dec. 4, 1945 |
| 2,499,069 | Kimball | Feb. 28, 1950 |
| 2,558,172 | Clark | June 26, 1951 |

FOREIGN PATENTS

| Number | Country | Date |
|---|---|---|
| 87,467 | Switzerland | Feb. 19, 1920 |
| 154,136 | Germany | Sept. 20, 1904 |
| 423,020 | Germany | Dec. 9, 1923 |